US012651299B2

(12) United States Patent
Stockley et al.

(10) Patent No.: US 12,651,299 B2
(45) Date of Patent: Jun. 9, 2026

(54) SYSTEMS AND METHODS FOR GENERATING REAL-TIME RESOURCE REDUCTION NOTIFICATIONS

(71) Applicant: Capital One Services, LLC, McLean, VA (US)

(72) Inventors: Kimberly Stockley, Washington, DC (US); Michael Mossoba, Great Falls, VA (US); David Septimus, New York, NY (US); Imren Johar, Clifton, VA (US); Shabnam Kousha, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 620 days.

(21) Appl. No.: 18/068,482

(22) Filed: Dec. 19, 2022

(65) Prior Publication Data

US 2024/0202032 A1 Jun. 20, 2024

(51) Int. Cl.
*G06Q 50/06* (2024.01)

(52) U.S. Cl.
CPC .................................... *G06Q 50/06* (2013.01)

(58) Field of Classification Search
CPC ...... G06Q 50/06; H02J 3/003; H02J 2300/28; H02J 2300/40; H02J 2300/24; G01W 1/10; G01W 1/14
USPC ........................................................ 705/412
See application file for complete search history.

(56) References Cited

U.S. PATENT DOCUMENTS

2020/0126103 A1* 4/2020 Rabison .................... H02J 3/12

OTHER PUBLICATIONS

"Machine learning approaches for estimating commercial building energy consumption" Published by Elsevier (Year: 2017).*

* cited by examiner

*Primary Examiner* — Zeina Elchanti
(74) *Attorney, Agent, or Firm* — Foley & Lardner LLP

(57) ABSTRACT

Systems and methods for generating real-time resource reduction notifications are described. The system receives, for a user system, a resource consumption and a dataset during a first period of time. The system processes the dataset to determine other user systems similar to the user system. The system generates an expected resource consumption of the user system during the first period of time based on resource consumption during one or more periods of time for the similar user systems. If the resource consumption of the user system exceeds the expected resource consumption, the system determines an action to reduce resource consumption of the user system. The system receives a reduced resource consumption of the user system during a second period of time. The system generates a notification to the similar user systems indicating the executed action and an amount of reduction in resource consumption.

20 Claims, 7 Drawing Sheets

400

SYSTEMS AND METHODS FOR GENERATING REAL-TIME RESOURCE REDUCTION NOTIFICATIONS

SUMMARY

Methods and systems are described herein for novel uses and/or improvements to artificial intelligence applications. As one example, methods and systems are described herein for analyzing resource consumption and related data from one or more user systems to generate real-time notifications to assist in reducing resource consumption for a particular user system and/or other user systems similar to the particular user system.

Conventional systems do not personalize recommendations for reducing resource consumption for a user system based on their particular circumstances which may affect the impact of such recommendations. For example, when generating recommendations for reducing resource consumption, conventional systems do not consider information like demographics of user systems or past results of actions recommended to other similar user systems. Therefore, the difficulty in adapting artificial intelligence models for this practical benefit faces several technical challenges such as a lack of follow-through data regarding the efficacy of past actions recommended to user systems and the lack of an established framework for selecting relevant parameters of the user system which may affect the impact of recommendations made to them.

To overcome these technical deficiencies in adapting artificial intelligence models for this practical benefit, methods and systems disclosed herein identify user systems similar to a particular user system and use related data from the similar user systems to identify a domain in which the particular user system may reduce resource consumption. For example, the system may provide demographic data and resource consumption data to a machine learning model, use the machine learning model to determine similar user systems, and consider the past performance of the similar user systems in generating recommendations for reducing resource consumption of the particular user system. Accordingly, the methods and systems can crowdsource related data from similar user systems and tailor recommendations for reducing resource consumption to the particular user system.

In some aspects, methods and systems are described herein comprising: receiving, for a first user system, a first resource consumption during a first period of time and a first dataset having information related to the first period of time; generating an expected resource consumption during the first period of time of the first user system based on resource consumption during one or more periods of time for a plurality of user systems similar to the first user system; in response to determining that the first resource consumption of the first user system during the first period of time exceeds the expected resource consumption by a first threshold amount, processing the first dataset, the first resource consumption, and the expected resource consumption using a machine learning model to determine an action that reduces the first resource consumption; receiving, for the first user system, a second resource consumption during a second period of time subsequent to executing the action that reduces the first resource consumption; and in response to determining that the second resource consumption of the first user system is reduced from the first resource consumption by a second threshold amount, generating a notification to the plurality of user systems indicating the executed action and an amount of reduction in resource consumption of the first user system.

Various other aspects, features, and advantages of the systems and methods described herein will be apparent through the detailed description and the drawings attached hereto. It is also to be understood that both the foregoing general description and the following detailed description are examples and are not restrictive of the scope of the systems and methods described herein. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION

In the following description, for the purposes of explanation, numerous specific details are set forth in order to provide a thorough understanding of the embodiments described herein. It will be appreciated, however, by those having skill in the art that the embodiments may be practiced without these specific details or with an equivalent arrangement. In other cases, well-known structures and devices are shown in block diagram form in order to avoid unnecessarily obscuring the embodiments.

Figure 1:
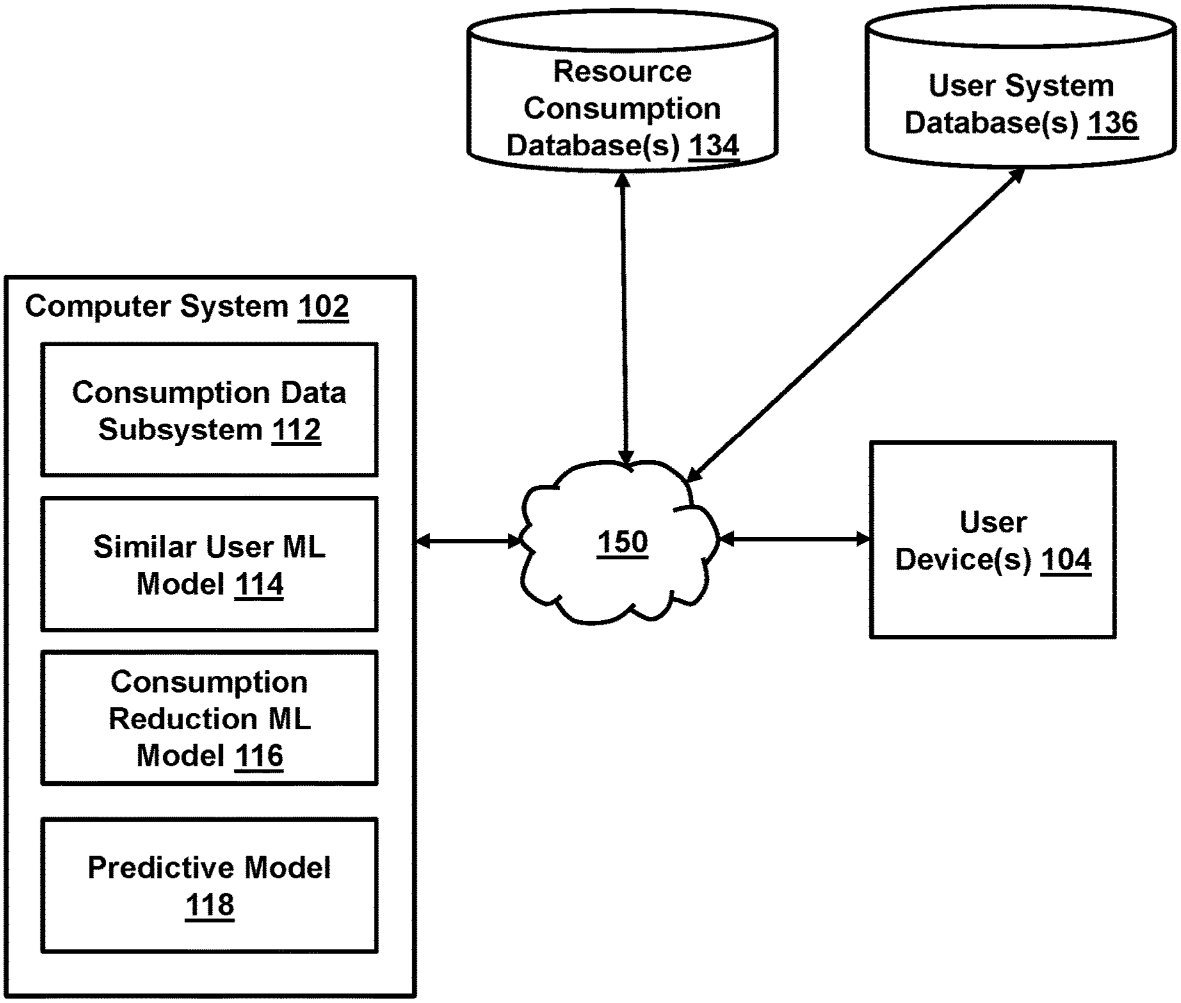
FIG. 1 shows an illustrative diagram for generating recommendations for reducing resource consumption, in accordance with one or more embodiments.

FIG. 1 shows an illustrative diagram for system 150, which contains hardware and software components used to select similar user systems and recommend actions which reduce resource consumption, in accordance with one or more embodiments. For example, Computer System 102, a part of system 150, may include Consumption Data Subsystem 112, Similar User ML Model 114, Consumption Reduction ML Model 116.

Consumption Data Subsystem 112 may retrieve to the system datasets that indicate the resource consumption of one or more user systems during one or more periods of time, as well as demographic datasets of user systems. For example, Consumption Data Subsystem 112 may retrieve a first resource consumption dataset from Resource Consumption Database(s) 134. If the user system is a corporation, Consumption Data Subsystem 112 may, for example, retrieve a dataset that indicates the user system's consumption of water, consumption of electricity, carbon emissions, etc. In addition, Consumption Data Subsystem 112 may browse Demographic Database(s) 136 and retrieve a dataset that describes the market capitalization of the user system, the number of employees of the user system, the sales volume of the user system, the geographical location of the user system, and the industry of the user system. Consumption Data Subsystem 112 may retrieve datasets such as the above for a variety of user systems during one or more periods of time.

In some embodiments, the system may process the first demographic dataset and/or the first resource consumption data from the first user system using a data cleansing process to generate a processed dataset. The data cleansing process may include removing outliers, standardizing data types, formatting and units of measurement, and removing duplicate data. The system may categorize each parameter in the processed dataset into one or more categories to generate a categorized dataset and generate a feature vector based on the categorized dataset.

Similar User ML Model 114 identifies user systems similar to a particular user system using demographic information of that user system. For example, Similar User ML Model 114 may receive from Consumption Data Subsystem 112 a feature based on a categorized demographic dataset. Similar User ML Model 114 is trained to perform clustering around the feature vector to find similar user systems. For example, Similar User ML Model 114 may represent other user systems in a real-valued vector space using feature vectors representing the demographics of user systems in User System Database(s) 136. Similar User ML Model 114 may use one or more clustering algorithms like K-means clustering, or Gaussian Mixed Models for points in the real-valued vector space. Similar User ML Model 114 may output a list of user systems determined to be similar to the input user system.

In some embodiments, the output of Similar User ML Model 114 may be labelled with metadata indicating the extent and nature of the similarity between each similar user system and the input user system. For example, Similar User ML Model 114 may return a list of numerical scores each indicating a degree of similarity between a similar user system and the input user system (e.g., the distance real-valued vector space between the similar user system and the input user system). Similar User ML Model 114 may also return a list of descriptions, each description in which show the category of demographic data in which the similar user system is most like the input user system.

In response to receiving from Similar User ML Model 114 a list of similar user systems with attached metadata, the system may use Predictive Model 118 to determine a mathematical derivation which may be used to determine an expected resource consumption for a user system. For example, the system may determine a percentile ranking of the user system among the list of similar user systems in terms of sales volume. For example, the user system is in the 56th percentile in this regard. Thus, the system may determine the expected resource consumption is the 56th percentile of resource consumption among similar user systems.

The system may compute a difference between the expected resource consumption and the resource consumption data for the first user system. The system may then compare the difference against a first threshold value, which may be a fixed value or a percentage of the expected resource consumption. In some embodiments, Predictive Model 118 may determine the percentage of the expected resource consumption from which to derive a first threshold value. For example, Predictive Model 118 may determine that exceeding the expectations for resource consumption by 8% would trigger the threshold. The resource consumption data, the expected resource consumption, the difference and the threshold value may all be vectors which list categories in some embodiments. The vector breakdown may show in which areas the resource consumption of the first user system exceeds expectations.

When the system determines that the resource consumption of the first user system exceeds expectations by a first threshold amount, the system may process the feature vector based on the first user system's demographic dataset, the first user system's resource consumption, and the expected resource consumption using Consumption Reduction ML Model 116 to determine an action that reduces the first resource consumption. In some embodiments, the system may generate an excess vector which captures the differences between the first user system's resource consumption and the expected resource consumption in one or more areas. Consumption Reduction ML Model 116 may perform multi-label classification on the feature vector and the excess vector to determine one or more categories the first user system falls into, corresponding to one or more actions which reduce resource consumption. The output of Consumption Reduction ML Model 116 may contain a representation of, for example, installing solar panels on buildings of the first user system to generate energy and reduce the carbon footprint of the first user system. Consumption Reduction ML Model 116 may use one or more algorithms like K-neighbors classification, naïve bayes classifiers, decision trees, logistic regression and/or neural networks to perform classification. The system may then use the output of Consumption Reduction ML Model 116 in combination a second vector that is representative of a plurality of areas based on the first resource consumption and the demographic data of the first user system to determine an action aimed at reducing the resource consumption of the first user system. Predictive Model 118 may, in some embodiments, weight the output of Consumption Reduction ML Model 116 by the second vector using a mathematical derivation. The mathematical derivation may be selected Predictive Model 118 or predetermined by the system. For example, the system may normalize the second vector into a unit vector (i.e., a vector of length 1) and multiply the output of Consumption Reduction ML Model 116 by the unit vector to determine from a plurality of actions recommended by Consumption Reduction ML Model 116 the action to recommend to the first user system.

The system may then generate a recommendation to the first user system detailing an action which reduce resource consumption when executed. Because the demographic data of the user system was considered in determining the actions, the system may recommend an action that are pertinent to the user system's needs.

The system may receive, for the first user system, a second resource consumption data during a second period of time subsequent to executing the recommended action. The second period of time may be the same length as the first period of time during which the first resource consumption data was collected and the second resource consumption data (e.g., from Resource Consumption Database(s) 134) may be of the same format as the first resource consumption data. The system may use a data cleansing process on the second resource consumption data. The data cleansing process may include removing outliers, standardizing data types, formatting and units of measurement, and removing duplicate data. The system may then compare the second resource consumption data against the first resource consumption data. To do so, the system may calculate a first discrepancy value capturing a difference between the resource consumption of the first user system in the first period of time and the expected resource consumption in the first period of time. The system may calculate a second discrepancy value capturing the difference between the resource consumption of the first user system during the second period of time and the expected resource consumption. The system may compute an improvement score capturing the difference between the first discrepancy value and the second discrepancy value. The system may generate a second threshold value and compare the first improvement score against the second threshold value to determine whether the second resource consumption of the first user system is reduced from the first resource consumption. The second threshold value may be computed by Predictive Model 118 and may be a flat value or a percentage of the expected resource consumption.

Upon determining that the second resource consumption of the first user system has been reduced from the first resource consumption, the system may generate (e.g., to User Device 104) a real-time notification with the first improvement score to the first user system and the plurality of user systems. The system may do this to congratulate the first user system and incentivize the plurality of user systems to also reduce their resource consumption. The system may indicate to the plurality of user systems the action that the first user system took to reduce their resource consumption. The system may tailor the real-time notification for different user systems of the plurality of user systems. For example, the system may inform one similar user system the reduction of resource consumption by the first user system in one area and the corresponding executed action. The similar user system may, for example, be a nearby corporation and the area may be water consumption. The system may inform another similar user system the reduction of resource consumption by the first user system in another area and the corresponding executed action. This similar user system may be a different corporation which is in the same industry as the first user system, but which is not geographically close. The area may be carbon emissions, with a corresponding action of implementing work-from-home arrangements.

Figure 2A:
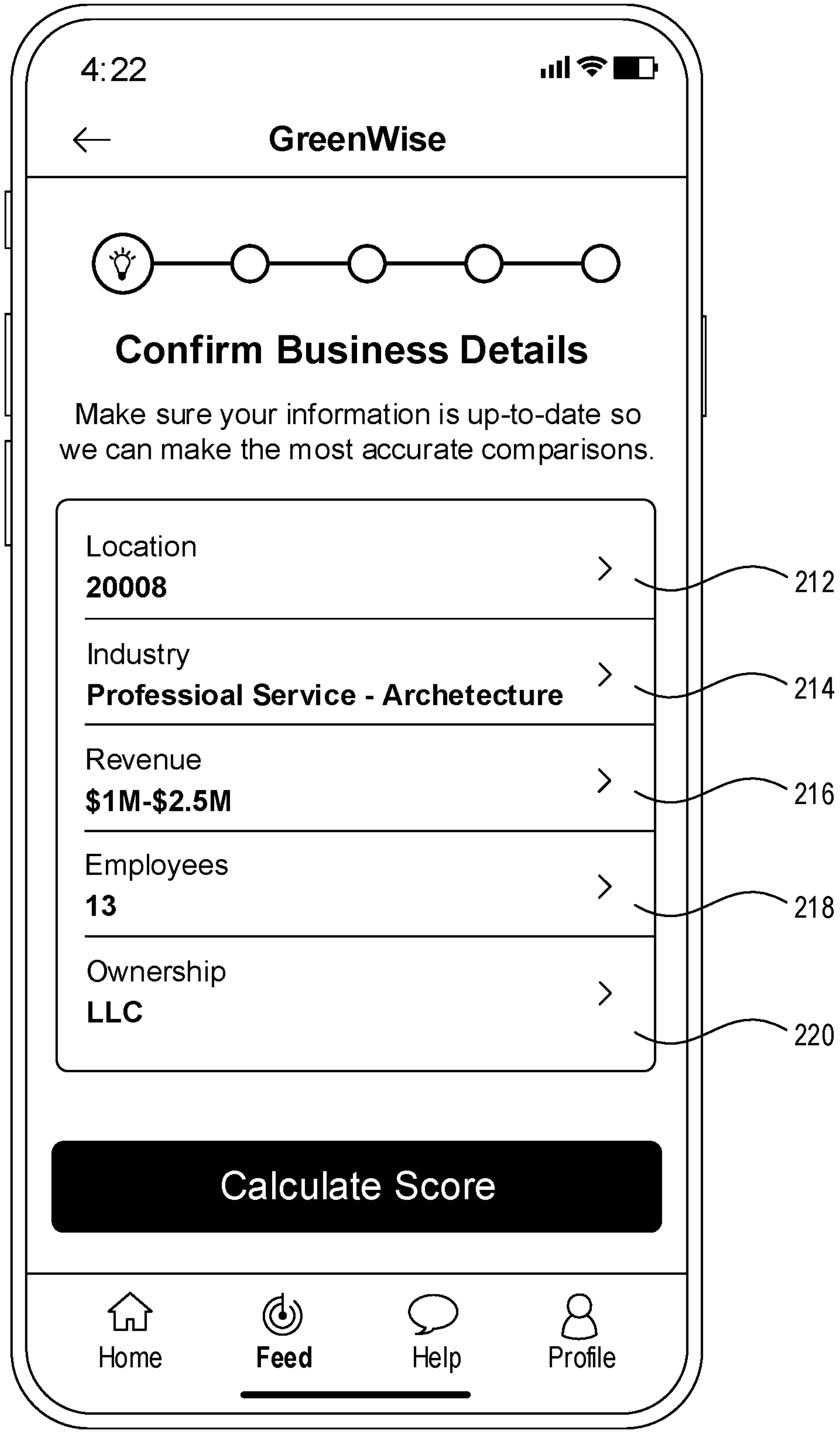
FIGS. 2A-2D show illustrative diagrams for displaying notifications and collecting data through user interfaces, in accordance with one or more embodiments.

FIG. 2A shows an illustrative diagram for a user interface that collects demographic information from a user system. This user interface may be located on, for example, User Device 104. Prompt 212 may have the user system input a geographical location (e.g., a zip code). Prompt 214 may have the user system provide the field or industry in which they may do business. In the case where the user system is not an organization (e.g., a computer system or network of computer systems), this field may refer to the function that a user system was designed to perform. Prompt 216 may collect the user system's revenue information. For corporations, this may be quarterly or yearly revenue. For computer systems, this field may represent the amount of traffic that the user system gets per period of time. Prompt 218 may collect the number of employees of the user system. Prompt 220 may collect the ownership information of the user system. For example, some user systems may be an LLC, some may be an LLP. For non-organization user systems, this field may be a category for a category of user system. The data collected by this user interface may be transmitted to and stored in User System Database(s) 136.

Figure 2B:
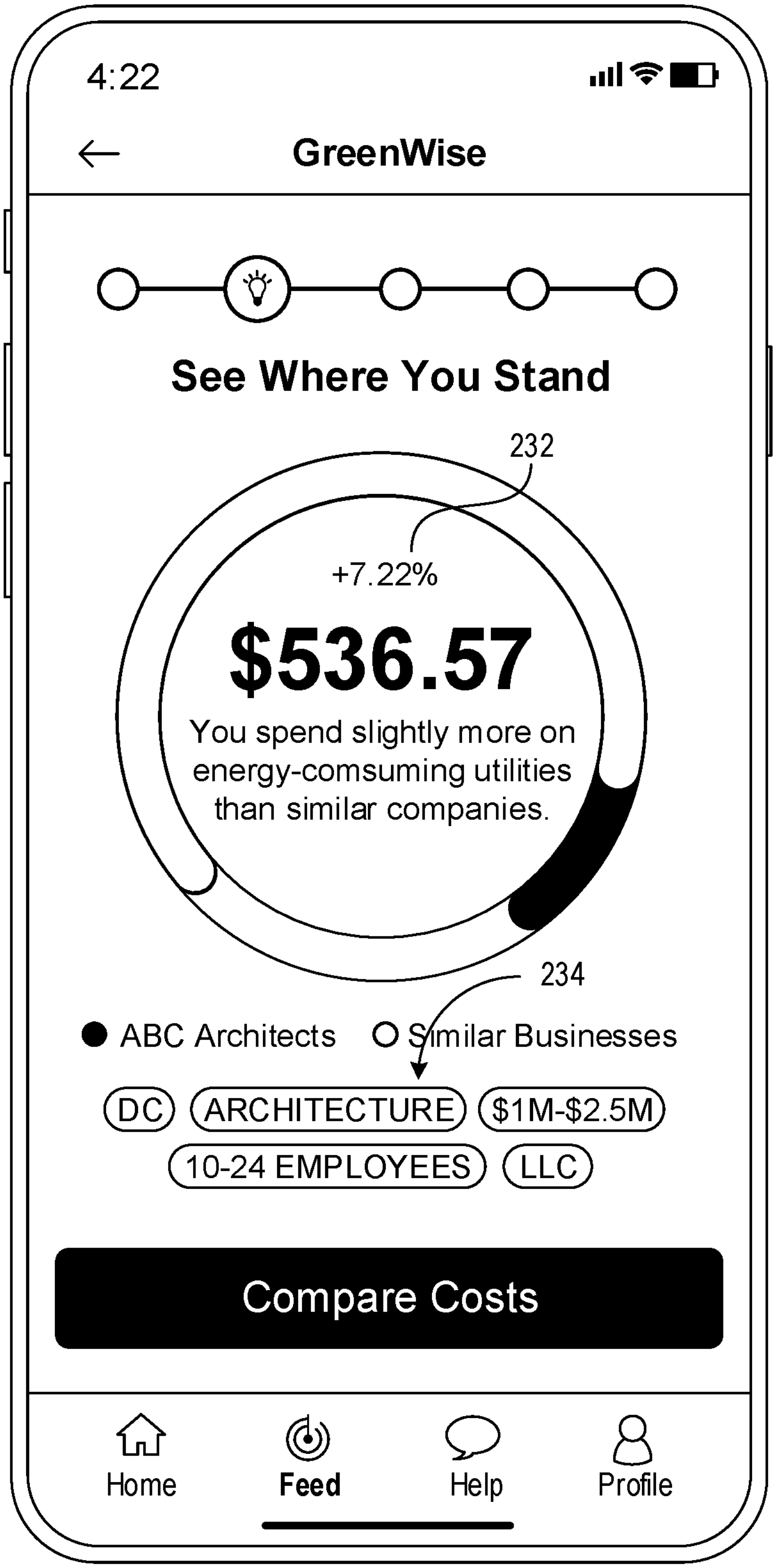

FIG. 2B shows a comparison between the resource consumption of the user system and the expected resource consumption of the user system. For example, graphic 232 shows that the user system spent $536.57 on energy-consuming utilities, which is 7% more than the expected energy consumption computed from similar companies. In addition, the user interface may display a demographic dataset collected, for example, by the previous user interface in 2A. Demographic display 234, including the tags representing data collected from the user system, informs the user system of the criteria which may be used in selecting the group of similar user systems against which the resource consumption of the user system has been compared.

Figure 2C:
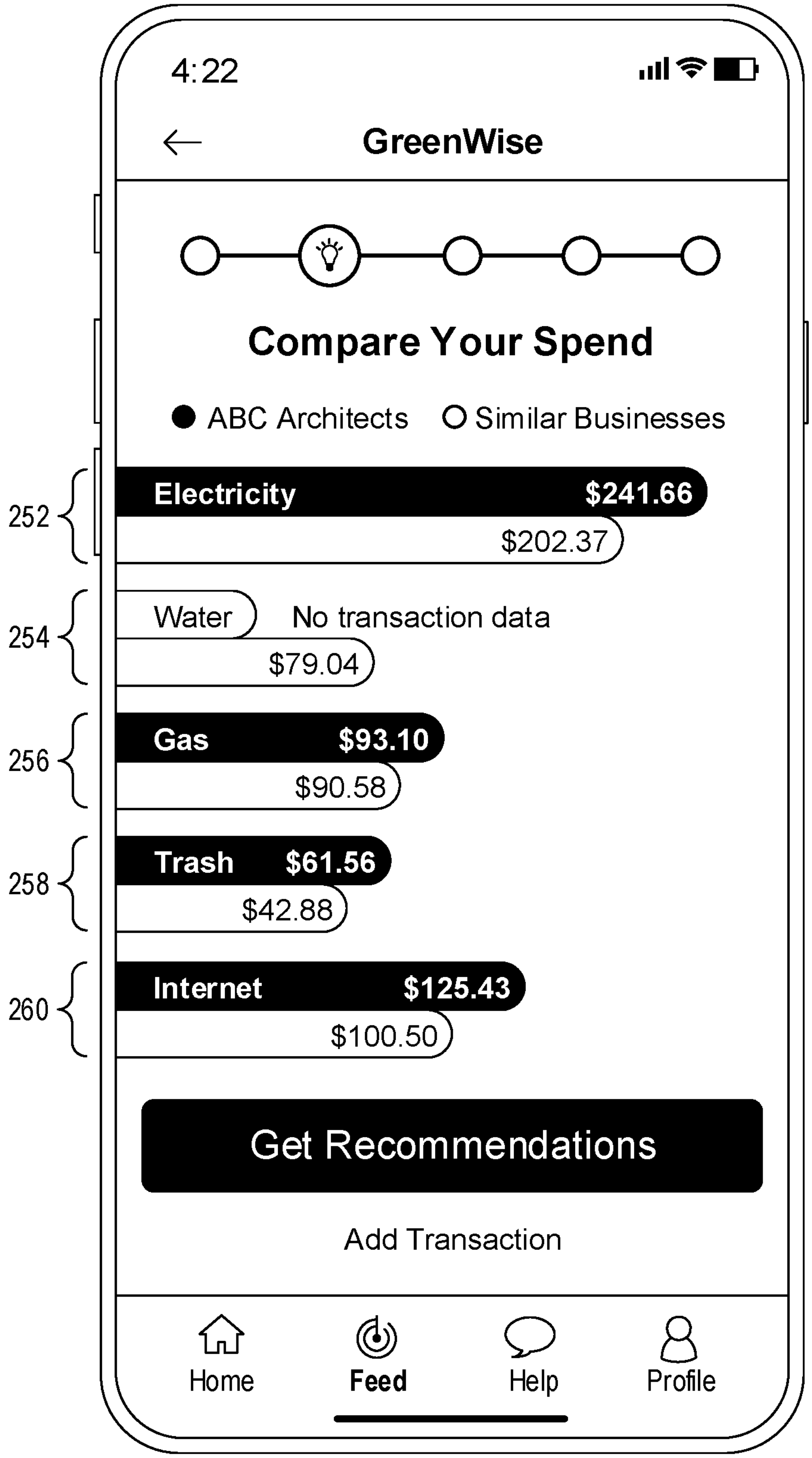

FIG. 2C illustrates a user interface showing a detailed, area-by-area breakdown of the resource consumption of the user system compared against expectations. This user interface may be shown alternatively or additionally to the user interface in 2B. Chart 252 shows dollar amounts in electricity spending by the user system and the expectation for such spending as computed from data of similar user systems. Charts 256, 258 and 260 do the same for gas spending, trash spending, and internet spending, respectively. Chart 254 shows that no data was available for the user system's water consumption. In some embodiments, the system may thus choose to ignore the area of water consumption in generating expectations.

Figure 2D:
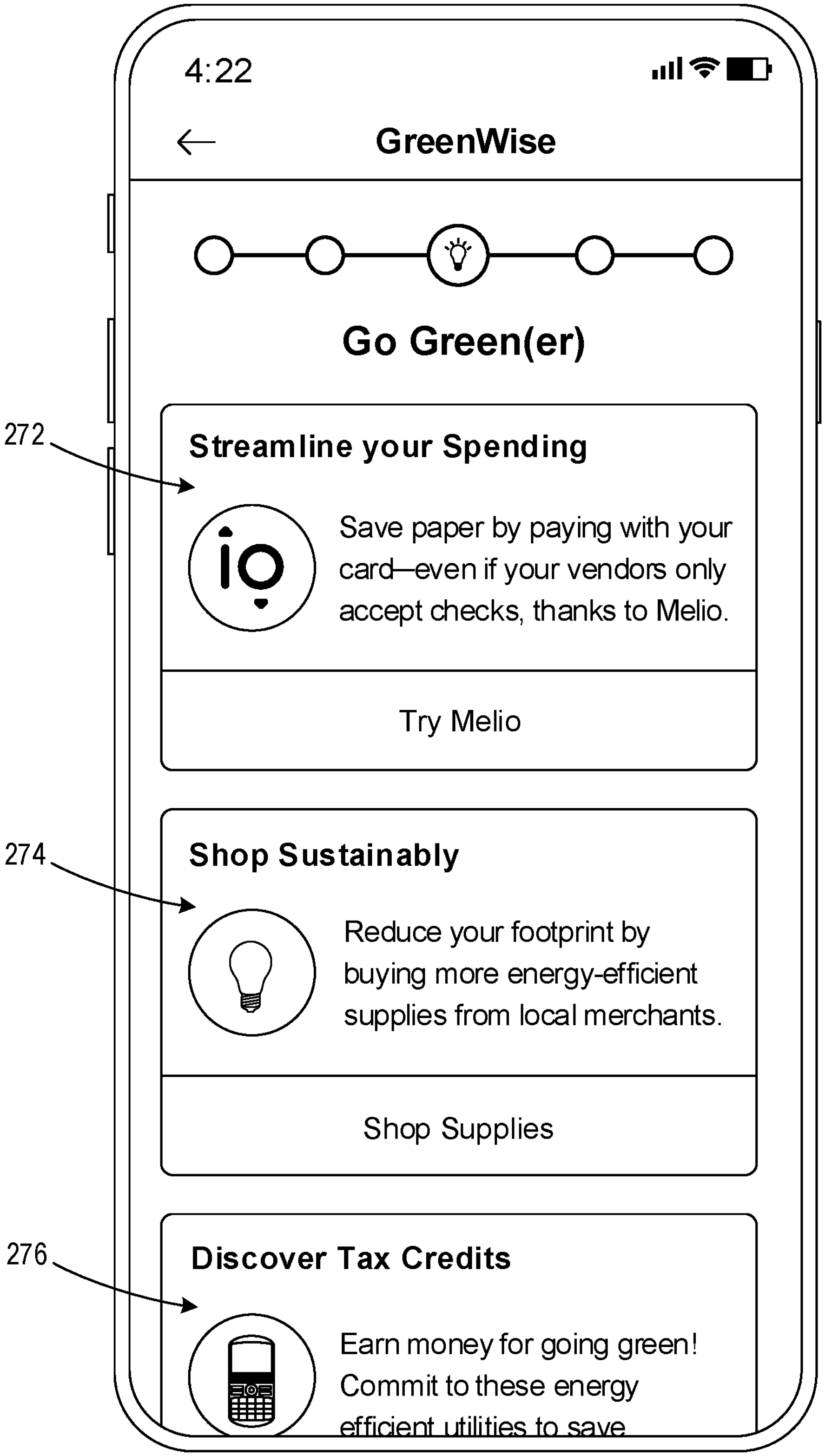

FIG. 2D shows the actions recommended to the user system such that they may reduce resource consumption. For example, Prompt 272 recommends a service that streamlines payments, which may reduce carbon emissions. Prompt 274 recommends purchasing energy-efficient supplies locally, and Prompt 276 recommends efficient utilities. One or more of these actions, when executed, may lead the system to reduce resource consumption in one or more areas.

Figure 3:
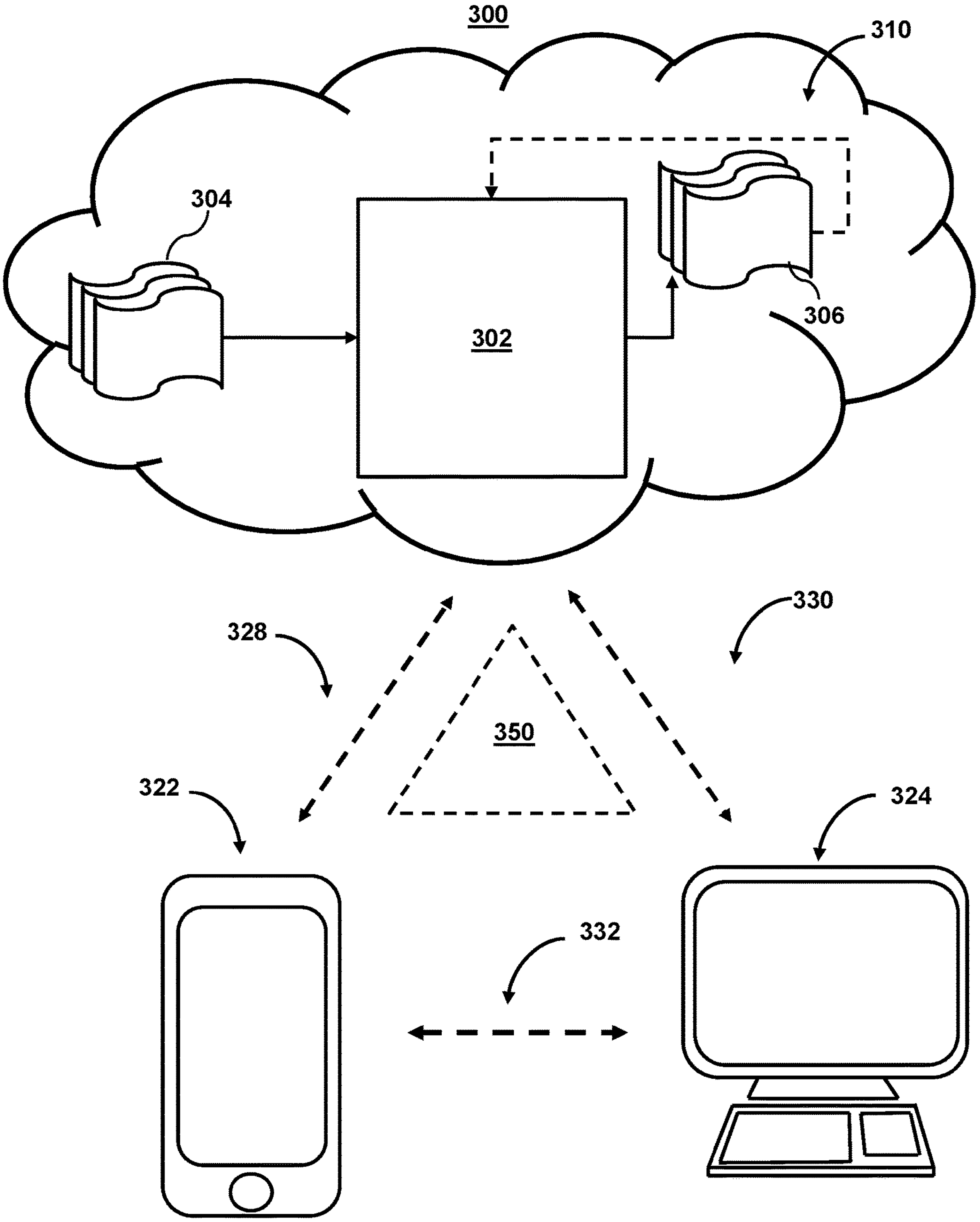
FIG. 3 shows illustrative components for a system used to generating recommendations for reducing resource consumption, in accordance with one or more embodiments.

FIG. 3 shows illustrative components for a system used to communicate between the system and user devices and collect data, in accordance with one or more embodiments. For example, FIG. 3 may show illustrative components for displaying the user interfaces of FIGS. 2A-2D on a user device. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system, and may feature one or more component devices. It should also be noted that system 300 is not limited to three devices. Users may, for instance, utilize one or more devices to interact with one another, one or more servers, or other components of system 300. It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include Computer System 102, may communicate with User Device(s) 104, and may access Resource Consumption Database(s) 134, User System Database(s) 136.

Cloud components 310 may include model 302, which may be a machine learning model, artificial intelligence model, etc. (which may be referred collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., predicting actions that reduce resource consumption based on demographic datasets of user systems).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., predicting actions that reduce resource consumption based on demographic datasets of user systems).

In some embodiments, the model (e.g., model 302) may automatically perform actions based on outputs 306. In some embodiments, the model (e.g., model 302) may not perform any actions. The output of the model (e.g., model 302) may be used to predict actions that reduce resource consumption based on demographic datasets of user systems).

System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web-services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDoS protection, and API layer 350 may use RESTful APIs as standard for external integration.

Figure 4:
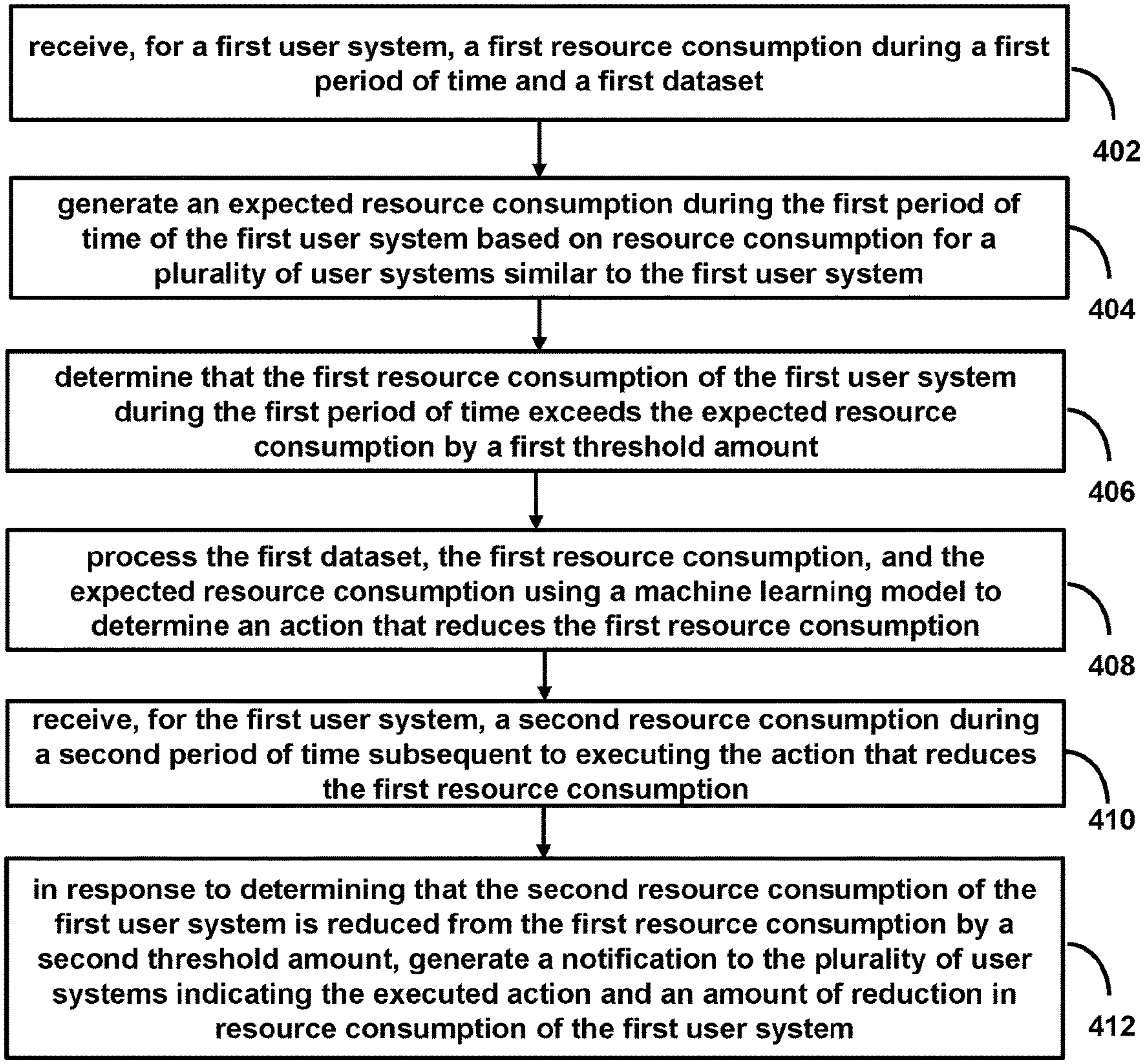
FIG. 4 shows a flowchart of the steps involved in generating recommendations for reducing resource consumption, in accordance with one or more embodiments.

FIG. 4 shows a flowchart of the steps involved in generate recommendations for reducing resource consumption, in accordance with one or more embodiments. For example, the system may use process 400 (e.g., as implemented on one or more system components described above) in order to collect and process data about a user system, select similar user systems, and select among a plurality actions that reduce resource consumption for the user system.

At step 402, process 400 (e.g., using one or more components described above) may receive, for a first user system, a first resource consumption during a first period of time and a first dataset. For example, the system may use one or more software components (e.g., application programming interfaces) to browse Resource Consumption Database (s) 134 and Demographic Database(s) 136 and retrieve a first resource consumption dataset from Resource Consumption Database(s) 134 and a first demographic dataset from Demographic Database(s) 136. For example, the system may process the first demographic dataset from the first user system using a data cleansing process to generate a processed dataset. The data cleansing process may include removing outliers, standardizing data types, formatting and units of measurement, and removing duplicate data. The system may categorize each parameter in the processed dataset into one or more categories to generate a categorized dataset and generate a feature vector based on the categorized dataset. Categories in the categorized dataset may indicate, for example, the size of user systems measured by traffic, or the sub-fields that user systems may operate in. The feature vector based on the categorized dataset may be a quantitative representation in a real-valued space of the categories assigned to one or more user systems. In some embodiments, the system may generate the feature vector using both the categorized dataset and the uncategorized demographic dataset from Demographic Database(s) 136. By forming a comprehensive and unambiguous vector representing the demographics of the user system, the system may fully inform models that select similar user systems to the first user system.

In some embodiments, the system may process the feature vector thus generated using a machine learning model (e.g., Similar User ML Model 114) to identify a plurality of similar user systems to the first user system. The system may perform clustering around the feature vector in a real-valued space to identify other user systems close to the first user system on one or more dimensions. The system may receive as output from the machine learning model a list of user systems determined to be similar to the first.

At step 404, process 400 (e.g., using one or more components described above) may generate an expected resource consumption during the first period of time of the first user system based on resource consumption for a plurality of user systems similar to the first user system. To do so, the system may select a first subset from the plurality of user systems and determine a mathematical derivation using the first dataset (e.g., demographic data) and the first subset. For example, the system may calculate a percentile ranking of the first user system among the first subset in one or more categories, such as size. The system may use the mathematical derivation on the first resource consumption to produce an estimate for the expected resource consumption. For example, if the first user system is ranked in the 86% percentile among the first subset (in, for example, traffic intensity), the expected resource consumption for the first user system may be the 86% percentile resource consumption among the first subset. In some embodiments, the system may use a model or a pre-determined program to generate the mathematical derivation. For example, the system may use linear regression on one or more parameters of user systems in the first subset to predict an expected resource consumption for the first user system.

At step 406, process 400 (e.g., using one or more components described above) may determine that the first resource consumption of the first user system during the first period of time exceeds the expected resource consumption by a first threshold amount. The first threshold amount may be a fixed numerical amount, or a percentage of the expected resource consumption. For example, the threshold amount may be 10,000 units of consumption, or 7% of the expected resource consumption. In some embodiments, the system may use a model to determine the first threshold amount. In addition, the first threshold amount may differ in each area of resource consumption.

At step 408, process 400 (e.g., using one or more components described above) may process the first dataset, the first resource consumption, and the expected resource consumption using a machine learning model to determine an action that reduces the first resource consumption. The system may generate as input to a second machine learning model the feature vector based on the categorized dataset and receive as output from the second machine learning model a first vector that is representative of a plurality of actions that reduce the resource consumption of the first user system. For example, one value in the first vector may represent an action that reduces the electricity bill of the user system. The system may generate a second vector that is representative of a plurality of areas based on the first resource consumption and the first dataset and weight the first vector by the second vector using a mathematical derivation to determine an action aimed at reducing the resource consumption of the first user system. For example, an entry in the second vector may represent the extent to which a user system may be impacted by reductions in electricity consumption. The mathematical derivation may be, for example, a multiplicative weight of the first vector using the second vector. The system may send a notification to the user system indicating the actions recommended to reduce resource consumption. In some embodiments, the notification may indicate a relative ranking of the actions based on expected user interest.

At step 410, process 400 (e.g., using one or more components described above) may receive, for the first user system, a second resource consumption during a second period of time subsequent to executing the action that reduces the first resource consumption. The second resource consumption may be of the same format as the first resource consumption, including the areas of resource consumption represented in the first resource consumption. In some embodiments, the system may determine a time delay after recommending to the user system actions that reduce resource consumption. The time delay may represent a period during which the user system may be expected to execute one or more of the actions recommended.

At step 412, process 400 (e.g., using one or more components described above) may in response to determining that the second resource consumption of the first user system is reduced from the first resource consumption by a second threshold amount, generate a notification to the plurality of user systems indicating the executed action and an amount of reduction in resource consumption of the first user system.

To determine that the second resource consumption of the first user system is reduced from the first resource consumption, the system may calculate a first discrepancy value capturing a difference between the resource consumption of the first user system in the first period of time and the expected resource consumption in the first period of time. The system may then calculate a second discrepancy value capturing the difference between the resource consumption of the first user system during the second period of time and the expected resource consumption during the first period of time. The system may calculate a first improvement score capturing the difference between the first discrepancy value and the second discrepancy value. For example, if the first discrepancy value is 400 units (i.e., the system's resource consumption in the first period of time exceeded expectations by 400 units), and the second discrepancy value is 120 units (i.e., the system's resource consumption in the second period of time exceeded expectations by 120 units), the improvement score would be 280 units. The system may then generate a second threshold value and compare the first improvement score against the second threshold value to determine whether the second resource consumption of the first user system is reduced from the first resource consumption. From the above example, if the second threshold is 150 units, the first improvement score would exceed the second threshold and the system may thus determine that the second resource consumption of the first user system is reduced from the first resource consumption.

In some embodiments, the system may generate a real-time notification to the plurality of user systems indicating the executed action and an amount of reduction in resource consumption of the first user system (e.g., the first improvement score). To generate such a notification, the system may select a second subset and a third subset from the plurality of user systems. The second subset and third subset may respectively be possible targets for recommendations for actions that reduce resource consumption. The system may generate a notification for the second subset comprising the reduction of resource consumption by the first user system in one area and the executed action, and generate a notification for the third subset comprising the reduction of resource consumption by the first user system in a different area and the executed action. For example, the system may show to a second subset the user system's reduction in water consumption and an associated executed action, and a third subset the user system's reduction in carbon emission and an associated executed action. By doing so, the system may encourage the plurality of user systems to partake in similar activities and stimulate motivation to reduce resource consumption.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A system, the system comprising: receiving, for a first user system, a first resource consumption during a first period of time and a first dataset having information related to the first period of time, the first dataset comprising a geographical location, a type of the first user system, and an amount of traffic handled by the first user system during the first period of time; processing the first dataset using a first machine learning model to determine a plurality of user systems similar to the first user system; generating an expected resource consumption during the first period of time of the first user system based on resource consumption during one or more periods of time for the plurality of user systems; in response to determining that the first resource consumption of the first user system during the first period of time exceeds the expected resource consumption by a threshold amount, processing the first dataset, the first resource consumption, and the expected resource consumption using a second machine learning model to determine an action that reduces the first resource consumption; receiving, for the first user system, a second resource consumption during a second period of time subsequent to executing the action that reduces the first resource consumption; and in response to determining that the second resource consumption of the first user system is reduced from the first resource consumption by the threshold amount, generating in real-time a notification to the plurality of user systems indicating the executed action and an amount of reduction in resource consumption of the first user system.

2. A method, comprising: receiving, for a first user system, a first resource consumption during a first period of time and a first dataset having information related to the first period of time; generating an expected resource consumption during the first period of time of the first user system based on resource consumption during one or more periods of time for a plurality of user systems similar to the first user system; in response to determining that the first resource consumption of the first user system during the first period of time exceeds the expected resource consumption by a first threshold amount, processing the first dataset, the first resource consumption, and the expected resource consumption using a machine learning model to determine an action that reduces the first resource consumption; receiving, for the first user system, a second resource consumption during a second period of time subsequent to executing the action that reduces the first resource consumption; and in response to determining that the second resource consumption of the first user system is reduced from the first resource consumption by a second threshold amount, generating a notification to the plurality of user systems indicating the executed action and an amount of reduction in resource consumption of the first user system.

3 The method of any one of the preceding embodiments, further comprising: processing the first dataset from the first user system using a data cleansing process to generate a processed dataset; categorizing each parameter in the processed dataset into one or more categories to generate a categorized dataset; and generating a feature vector based on the categorized dataset.

4. The method of any one of the preceding embodiments, wherein generating the expected resource consumption of the first user system comprises: selecting a first subset from the plurality of user systems; determining a mathematical derivation using the first dataset and the first subset; and using the mathematical derivation on the first resource consumption to produce an estimate for the expected resource consumption.

5. The method of any one of the preceding embodiments, wherein determining that the second resource consumption of the first user system is reduced from the first resource consumption comprises: calculating a first discrepancy value capturing a difference between the resource consumption of the first user system in the first period of time and the expected resource consumption in the first period of time; and calculating a second discrepancy value capturing the difference between the resource consumption of the first user system during the second period of time and the expected resource consumption during the first period of time.

6. The method of any one of the preceding embodiments, further comprising: generating a second threshold value; calculating a first improvement score capturing the difference between the first discrepancy value and the second discrepancy value; and comparing the first improvement score against the second threshold value to determine whether the second resource consumption of the first user system is reduced from the first resource consumption.

7. The method of any one of the preceding embodiments, further comprising generating a real-time notification to the plurality of user systems comprising the first improvement score.

8. The method of any one of the preceding embodiments, further comprising: generating as input to a second machine learning model the feature vector based on the categorized dataset; and receiving as output from the second machine learning model a first vector that is representative of a plurality of actions that reduce the resource consumption of the first user system.

9. The method of any one of the preceding embodiments, further comprising: generating a second vector that is representative of a plurality of areas based on the first resource consumption and the first dataset; and weighting the first vector by the second vector using a mathematical derivation to determine an action aimed at reducing the resource consumption of the first user system.

10. The method of any one of the preceding embodiments, wherein generating a notification to the plurality of user systems comprises: selecting a second subset and a third subset from the plurality of user systems; generating a notification for the second subset comprising the reduction of resource consumption by the first user system in one area and the executed action; and generating a notification for the third subset comprising the reduction of resource consumption by the first user system in a different area and the executed action.

11. The method of any one of the preceding embodiments, wherein the first threshold amount comprises a percentage of the expected resource consumption or a fixed value.

12. A non-transitory, computer-readable medium comprising instructions that, when executed by one or more processors, cause operations comprising those of any of embodiments 1-10.

13. A system comprising one or more processors; and memory storing instructions that, when executed by the processors, cause the processors to effectuate operations comprising those of any of embodiments 1-10.

14. A system comprising means for performing any of embodiments 1-10.

What is claimed is:

1. A system comprising:

one or more processors; and a non-transitory, computer readable medium comprising instructions that when executed by the one or more processors cause operations comprising:

receiving, for a first user system, a first resource consumption during a first period of time and a first dataset having information related to the first period of time, the first dataset comprising a geographical location, a type of the first user system, and an amount of traffic handled by the first user system during the first period of time;

training, based on the first dataset and a feature vector, a first machine learning model to cluster a plurality of user systems similar to the first user system;

using the first machine learning model to determine the plurality of user systems similar to the first user system;

generating, based on an output of the first machine learning model, an expected resource consumption during the first period of time of the first user system based on resource consumption during one or more periods of time for the plurality of user systems;

processing, based on the first resource consumption, of the first user system during the first period of time, exceeding the expected resource consumption by a threshold amount, the first dataset, the first resource consumption, and the expected resource consumption using the first machine learning model to determine an action that reduces the first resource consumption;

receiving, for the first user system, a second resource consumption during a second period of time subsequent to executing the action that reduces the first resource consumption; and generating, based on the second resource consumption, of the first user system during the second period of time, being less than the first resource consumption by the threshold amount, a recommendation to the plurality of user systems indicating the executed action and an amount of reduction in resource consumption of the first user system.

2. A method, comprising:

receiving, for a first user system, a first resource consumption during a first period of time and a first dataset having information related to the first period of time;

training, based on the first dataset and a feature vector, a first machine learning model to cluster a plurality of user systems similar to the first user system;

generating an expected resource consumption during the first period of time of the first user system based on resource consumption during one or more periods of time for the plurality of user systems similar to the first user system;

processing, based on the first resource consumption, of the first user system during the first period of time, exceeding the expected resource consumption by a threshold amount, the first dataset, the first resource consumption, and the expected resource consumption using the first machine learning model to determine an action that reduces the first resource consumption;

receiving, for the first user system, a second resource consumption during a second period of time subsequent to executing the action that reduces the first resource consumption; and generating, based on the second resource consumption being less than the first resource consumption by the threshold amount, a notification to the plurality of user systems indicating the executed action and an amount of reduction in resource consumption of the first user system.

3. The method of claim 2, further comprising:

processing the first dataset from the first user system using a data cleansing process to generate a processed dataset;

categorizing each parameter in the processed dataset into one or more categories to generate a categorized dataset; and generating the feature vector based on the categorized dataset.

4. The method of claim 2, wherein generating the expected resource consumption of the first user system comprises:

selecting a first subset from the plurality of user systems;

determining a mathematical derivation using the first dataset and the first subset; and using the mathematical derivation on the first resource consumption to produce an estimate for the expected resource consumption.

5. The method of claim 2, wherein determining that the second resource consumption of the first user system is reduced from the first resource consumption comprises:

calculating a first discrepancy value capturing a difference between the resource consumption of the first user system in the first period of time and the expected resource consumption in the first period of time; and calculating a second discrepancy value capturing the difference between the resource consumption of the first user system during the second period of time and the expected resource consumption during the first period of time.

6. The method of claim 5, further comprising:

generating a second threshold value;

calculating a first improvement score capturing the difference between the first discrepancy value and the second discrepancy value; and comparing the first improvement score against the second threshold value to determine whether the second resource consumption of the first user system is reduced from the first resource consumption.

7. The method of claim 6, further comprising generating a real-time notification to the plurality of user systems comprising the first improvement score.

8. The method of claim 3, further comprising:

generating as input to a second machine learning model the feature vector based on the categorized dataset; and receiving as output from the second machine learning model a first vector that is representative of a plurality of actions that reduce the resource consumption of the first user system.

9. The method of claim 8, further comprising:

generating a second vector that is representative of a plurality of areas based on the first resource consumption and the first dataset; and weighting the first vector by the second vector using a mathematical derivation to determine an action aimed at reducing the resource consumption of the first user system.

10. The method of claim 2, wherein generating the notification to the plurality of user systems comprises:

selecting a second subset and a third subset from the plurality of user systems;

generating a notification for the second subset comprising the reduction of resource consumption by the first user system in one area and the executed action; and generating a notification for the third subset comprising the reduction of resource consumption by the first user system in a different area and the executed action.

11. The method of claim 2, wherein the threshold amount comprises a percentage of the expected resource consumption or a fixed value.

12. One or more non-transitory, computer-readable media comprising instructions that, when executed by one or more processors, cause operations comprising:

receiving, for a first user system, a first resource consumption during a first period of time and a first dataset having information related to the first period of time;

training, based on the first dataset and a feature vector, a machine learning model to cluster a plurality of user systems similar to the first user system;

using the machine learning model to determine the plurality of user systems similar to the first user system;

receiving, for the first user system, a second resource consumption during a second period of time subsequent to executing an action that reduces the first resource consumption; and generating, based on the second resource consumption, of the first user system during the second period of time, being less than the first resource consumption by a threshold amount, a notification to the plurality of user systems indicating the executed action and an amount of reduction in resource consumption of the first user system.

13. The one or more non-transitory, computer-readable media of claim 12, wherein the instructions further cause the one or more processors to perform operations comprising:

processing the first dataset from the first user system using a data cleansing process to generate a processed dataset;

categorizing each parameter in the processed dataset into one or more categories to generate a categorized dataset; and generating the feature vector based on the categorized dataset.

14. The one or more non-transitory, computer-readable media of claim 12, wherein the instructions further cause the one or more processors to perform operations comprising:

selecting a first subset from the plurality of user systems;

determining a mathematical derivation using the first dataset and the first subset; and using the mathematical derivation on the first resource consumption to produce an estimate for an expected resource consumption.

15. The one or more non-transitory, computer-readable media of claim 14, wherein determining that the second resource consumption of the first user system is reduced from the first resource consumption comprises:

generating a second threshold value;

calculating a first discrepancy value capturing a difference between the resource consumption of the first user system in the first period of time and the expected resource consumption in the first period of time;

calculating a second discrepancy value capturing the difference between the resource consumption of the first user system during the second period of time and the expected resource consumption during the first period of time;

calculating a first improvement score capturing the difference between the first discrepancy value and the second discrepancy value; and determining the first improvement score exceeds the second threshold value.

16. The one or more non-transitory, computer-readable media of claim 15, wherein the instructions further cause the one or more processors to perform operations comprising generating a real-time notification to the plurality of user systems comprising the first improvement score.

17. The one or more non-transitory, computer-readable media of claim 13, wherein the instructions further cause the one or more processors to perform operations comprising:

generating as input to a second machine learning model the feature vector based on the categorized dataset; and receiving as output from the second machine learning model a first vector that is representative of a plurality of actions that reduce the resource consumption of the first user system.

18. The one or more non-transitory, computer-readable media of claim 17, wherein the instructions further cause the one or more processors to perform operations comprising:

generating a second vector that is representative of a plurality of areas based on the first resource consumption and the first dataset; and weighting the first vector by the second vector using a mathematical derivation to determine an action aimed at reducing the resource consumption of the first user system.

19. The one or more non-transitory, computer-readable media of claim 12, wherein generating the notification to the plurality of user systems comprises:

selecting a second subset and a third subset from the plurality of user systems;

generating a notification for the second subset comprising the reduction of resource consumption by the first user system in one area and the executed action; and generating a notification for the third subset comprising the reduction of resource consumption by the first user system in a different area and the executed action.

20. The one or more non-transitory, computer-readable media of claim 14, wherein the threshold amount comprises a percentage of the expected resource consumption or a fixed value.

* * * * *